(12) United States Patent
Misso

(10) Patent No.: US 6,744,604 B2
(45) Date of Patent: Jun. 1, 2004

(54) LOW PARTICULATING LATCH FOR A DISC DRIVE

(75) Inventor: Nigel F. Misso, Yukon, OK (US)

(73) Assignee: Seagate Technology LLC, Scotts Valley, CA (US)

(*) Notice: Subject to any disclaimer, the term of this patent is extended or adjusted under 35 U.S.C. 154(b) by 306 days.

(21) Appl. No.: 09/981,819

(22) Filed: Oct. 17, 2001

(65) Prior Publication Data

US 2002/0135944 A1 Sep. 26, 2002

Related U.S. Application Data

(60) Provisional application No. 60/277,872, filed on Mar. 21, 2001.

(51) Int. Cl.[7] .............................................. G11B 21/22
(52) U.S. Cl. ....................................................... 360/256
(58) Field of Search ............................. 360/256, 256.4, 360/256.5, 256.6

(56) References Cited

U.S. PATENT DOCUMENTS

| | | |
|---|---|---|
| 4,594,627 A | 6/1986 | Viskochil et al. |
| 4,635,151 A | 1/1987 | Hazebrouck |
| 4,647,997 A | 3/1987 | Westwood |
| 4,773,537 A | 9/1988 | Kikuchi |
| 4,881,139 A | 11/1989 | Hazebrouck |
| 4,890,176 A | 12/1989 | Casey et al. |
| 4,937,692 A | 6/1990 | Okutsu |
| 4,949,206 A | 8/1990 | Phillips et al. |
| 4,982,303 A | 1/1991 | Krenz |
| 5,034,837 A | 7/1991 | Schmitz |
| 5,043,834 A | 8/1991 | Kubo et al. |
| 5,134,608 A | 7/1992 | Strickler et al. |
| 5,159,501 A | 10/1992 | Genheimer |
| 5,187,627 A | 2/1993 | Hickox et al. |
| 5,224,000 A | 6/1993 | Casey et al. |
| 5,231,556 A | 7/1993 | Blanks |
| 5,262,912 A | 11/1993 | Hudson et al. |
| 5,268,223 A | 12/1993 | Qureshi et al. |
| 5,291,355 A | 3/1994 | Hatch et al. |
| 5,303,101 A * | 4/1994 | Hatch et al. ............... 360/256 |
| 5,319,519 A | 6/1994 | Sheppard et al. |
| 5,341,259 A | 8/1994 | Amirkiai et al. |
| 5,363,261 A | 11/1994 | Eckberg et al. |
| 5,377,065 A | 12/1994 | Morehouse et al. |
| 5,404,636 A | 4/1995 | Stefansky et al. |
| 5,420,726 A | 5/1995 | Mathews et al. |
| 5,528,437 A | 6/1996 | Mastache |
| 5,532,891 A | 7/1996 | Tsujino |
| 5,568,333 A | 10/1996 | Bang |
| 5,581,424 A | 12/1996 | Dunfield et al. |
| 5,583,724 A | 12/1996 | Kim et al. |
| 5,600,516 A | 2/1997 | Phillips et al. |
| 5,602,700 A | 2/1997 | Viskochil et al. |
| 5,608,592 A | 3/1997 | Mizoshita et al. |
| 5,612,842 A | 3/1997 | Hickox et al. |
| 5,623,384 A | 4/1997 | Hickox et al. |
| 5,636,090 A | 6/1997 | Boigenzahn et al. |
| 5,663,855 A | 9/1997 | Kim et al. |
| 5,671,104 A | 9/1997 | Takahashi et al. |
| 5,689,386 A | 11/1997 | Morehouse et al. |
| 5,694,271 A | 12/1997 | Stefansky |
| 5,712,750 A | 1/1998 | Kim |
| 5,715,119 A | 2/1998 | Williams et al. |
| 5,717,548 A | 2/1998 | Koester et al. |
| 5,729,208 A | 3/1998 | Ogiwara |
| 5,734,527 A | 3/1998 | Reinhart |

(List continued on next page.)

*Primary Examiner*—William Korzuch
*Assistant Examiner*—Mark Blouin
(74) *Attorney, Agent, or Firm*—Fellers, Snider, et al.

(57) ABSTRACT

A material compound for a latch for a disc drive to secure an actuator of the disc drive when the disc drive is not in use. The latch is made of a base polymer of polyetherimide with additives of polytetrafluoroethylene (PTFE) and arimid fiber. The latch made from this material generates substantially fewer particles than latches of the existing art. A method for making the latch is also provided.

10 Claims, 3 Drawing Sheets

U.S. PATENT DOCUMENTS

| | | |
|---|---|---|
| 5,768,057 A | 6/1998 | Fernandes et al. |
| 5,793,572 A | 8/1998 | Lalouette et al. |
| 5,801,904 A | 9/1998 | Kinoshita et al. |
| 5,812,345 A | 9/1998 | MacPherson et al. |
| 5,812,346 A | 9/1998 | Williams et al. |
| 5,831,795 A | 11/1998 | Ma et al. |
| 5,905,606 A | 5/1999 | Johnson et al. |
| 5,905,888 A | 5/1999 | Jones et al. |
| 5,982,586 A | 11/1999 | Scura |
| 5,990,707 A | 11/1999 | Goldenberg et al. |
| 6,064,535 A | 5/2000 | Wilson et al. |
| 6,088,193 A | 7/2000 | Misso et al. |
| 6,122,163 A | 9/2000 | Stone et al. |
| 6,134,077 A * | 10/2000 | Misso et al. ............... 360/256 |
| 6,134,087 A | 10/2000 | Khan et al. |
| 6,172,855 B1 | 1/2001 | Kim |
| 6,198,603 B1 * | 3/2001 | West ............... 360/256 |
| 6,212,043 B1 | 4/2001 | Nakamura et al. |
| 2003/0107846 A1 * | 6/2003 | Shikii ............... 360/256 |

* cited by examiner

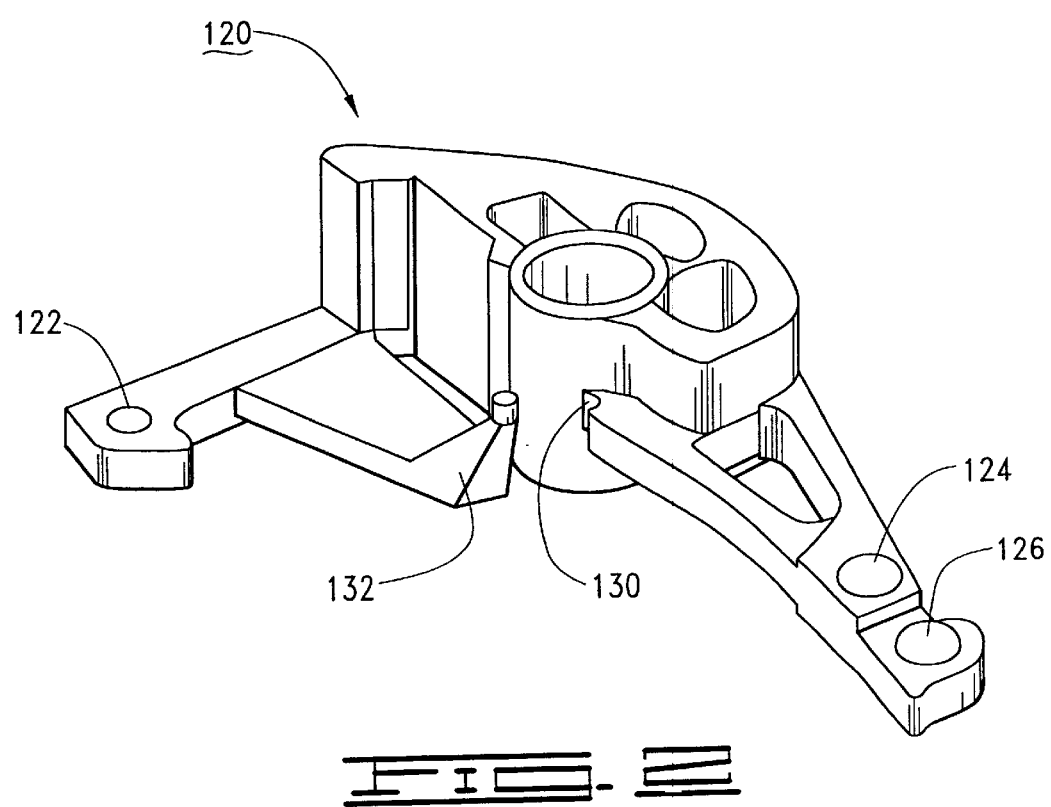

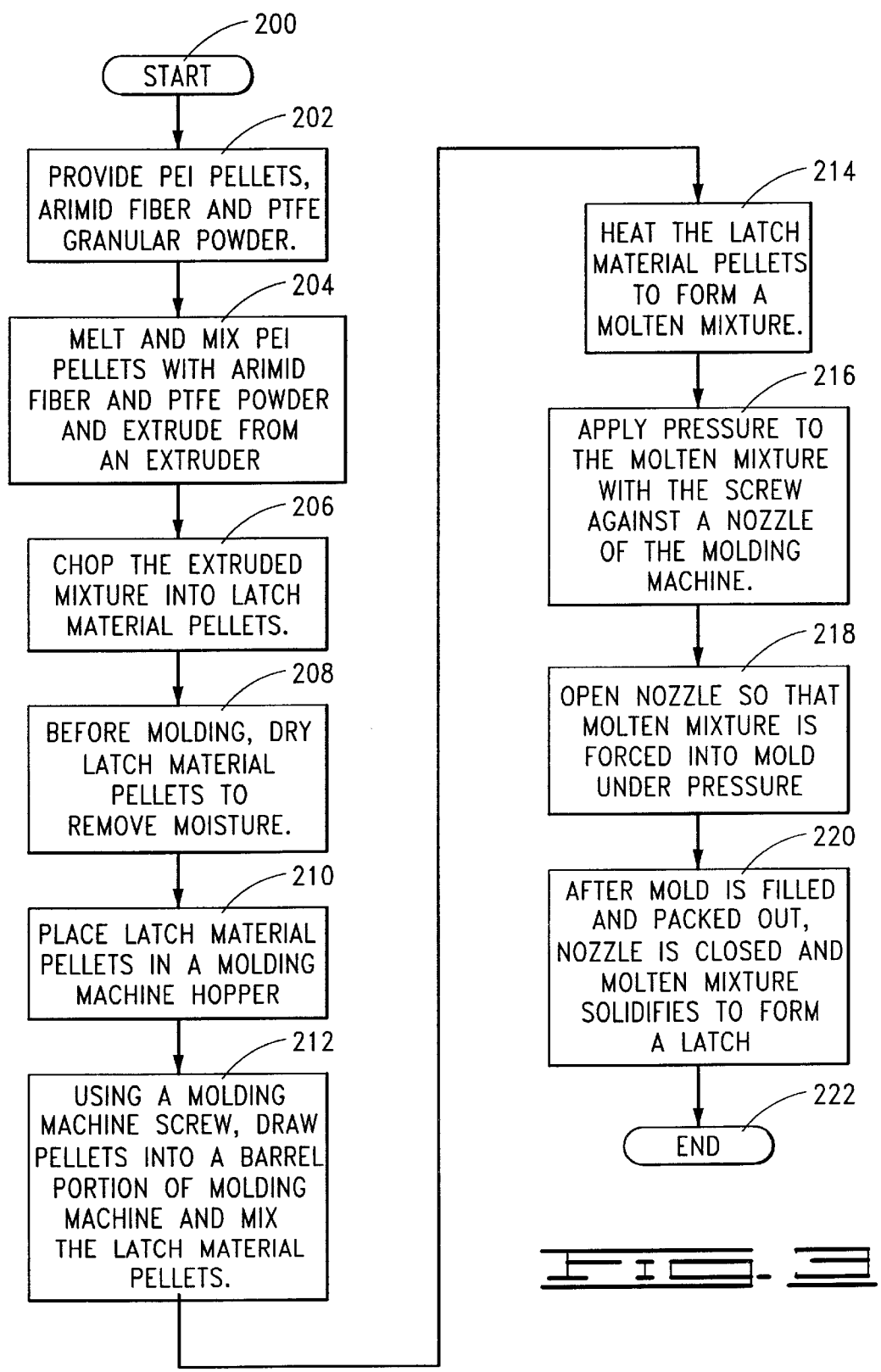

LOW PARTICULATING LATCH FOR A DISC DRIVE

RELATED APPLICATIONS

This application claims the benefit of U.S. Provisional Application No. 60/277,872 entitled MATERIAL FOR LATCH filed Mar. 21, 2001.

FIELD OF THE INVENTION

The claimed invention relates generally to disc drive data storage devices and more particularly to a latch for the disc drive.

BACKGROUND OF THE INVENTION

Data storage devices of the type known as "Winchester" disc drives are well known in the industry. These disc drives magnetically record digital data on several circular, concentric data tracks on the surfaces of one or more rigid discs. The discs are typically mounted for rotation on the hub of a spindle motor. In disc drives of the current generation, the discs are rotated at speeds of 10,000 revolutions per minute or more.

Data are recorded to and retrieved from the discs by an array of vertically aligned read/write head assemblies, or heads, which are controllably positioned by an actuator assembly. Each head typically includes electromagnetic transducer read and write elements which are carried on an air bearing slider. The slider acts in a cooperative hydrodynamic relationship with a thin layer of air dragged along by the spinning discs to fly each head in a closely spaced relationship to the disc surface. In order to maintain the proper flying relationship between the heads and the discs, the heads are attached to and supported by head suspensions or flexures.

Historically, the actuator assembly used to position the heads has assumed many forms. Most disc drives of the current generation incorporate an actuator of the type referred to as a rotary voice coil actuator. A typical rotary voice coil actuator includes a pivot shaft fixed to a disc drive housing base deck at a location adjacent an outer edge of the discs. The pivot shaft is mounted such that its central axis is normal to the plane of rotation of the discs. An actuator bearing housing is mounted to the pivot shaft by an arrangement of precision ball bearing assemblies. The actuator bearing housing supports a coil that is immersed in a magnetic field of permanent magnets. The permanent magnets are mounted to the disc drive housing base deck.

On the side of the actuator bearing housing opposite the coil are a plurality of vertically aligned, radially extending actuator arms. The flexures are mounted to the actuator arms. When current is applied to the coil, the coil produces a magnetic field that interacts with the magnetic field of the permanent magnets to pivot the actuator bearing housing about the pivot shaft, thereby moving the heads across the disc surfaces.

Disc drives of the current generation are included in desk-top computer systems for office and home environments, as well as in laptop computers. Because of this wide range of operating environments, the computer systems, as well as the disc drives incorporated in them, must be capable of reliable operation over a wide range of ambient temperatures and mechanical forces.

When the disc drive is not in use, the read/write heads are brought to rest upon parked locations of the discs. These parked locations are regions on the discs separate from the data storage locations. Typically, each parked location provides a landing zone on each of the disc surfaces where the read/write heads are positioned before the rotational velocity of the spinning discs decreases below a threshold velocity necessary to sustain an air bearing. The parked location is typically located near an inner diameter of the discs.

After the heads are in the parked location, it is necessary to secure the actuator assembly by a latch to prevent the heads from subsequently moving onto the data locations of the discs while the disc drive is not in use. Latches are well known in the art and have included various configurations of springs, solenoids, and magnets to secure and release the actuator. For example, see U.S. Pat. No. 6,134,077 entitled LATCH FOR DISC DRIVES, issued Oct. 17, 2000 to Misso et al., U.S. Pat. No. 5,187,627 entitled MAGNETIC LATCH AND CRASH STOP, issued to Feb. 16, 1993 to Hickox et al., and U.S. Pat. No. 5,224,000 entitled CRASH STOP AND MAGNETIC LATCH FOR A VOICE COIL ACTUATOR, issued Jun. 29, 1993 to Casey et al. All of these patents listed above are assigned to the assignee of the present invention.

The actuator is moved to the latched and unlatched position many times over the operational life of a disc drive. The repetitive, typically high energy contacts between the actuator and the latch can lead to wear and particulation of the contact surfaces of the latch. Such particulates can be detrimental to the operation of the drive. As drives achieve ever higher levels of operational performance, it becomes increasingly important to provide latches with improved wear and non-particulating characteristics, and it is to such improvements that the present invention is directed.

SUMMARY OF THE INVENTION

In accordance with preferred embodiments, a latch is provided for use in a disc drive to secure an actuator assembly of the disc drive when the disc drive is not in use. The latch is made of a base polymer of polyetherimide (PEI) with additives of polytetrafluoroethylene (PTFE) and arimid fiber. The latch made from this material generates significantly fewer particles and provides substantially improved wear characteristics as compared to latches of the existing art. Also, a method is provided for making the latch.

These and various other features and advantages that characterize the claimed invention will be apparent upon reading of the following detailed description and review of the associated drawings.

BRIEF DESCRIPTION OF THE DRAWINGS

FIG. 2 is an isometric view of the latch of FIG. 1.

FIG. 3 is a flow chart illustrating preferred steps for making the latch of FIGS. 1 and 2.

DETAILED DESCRIPTION

Figure 1:
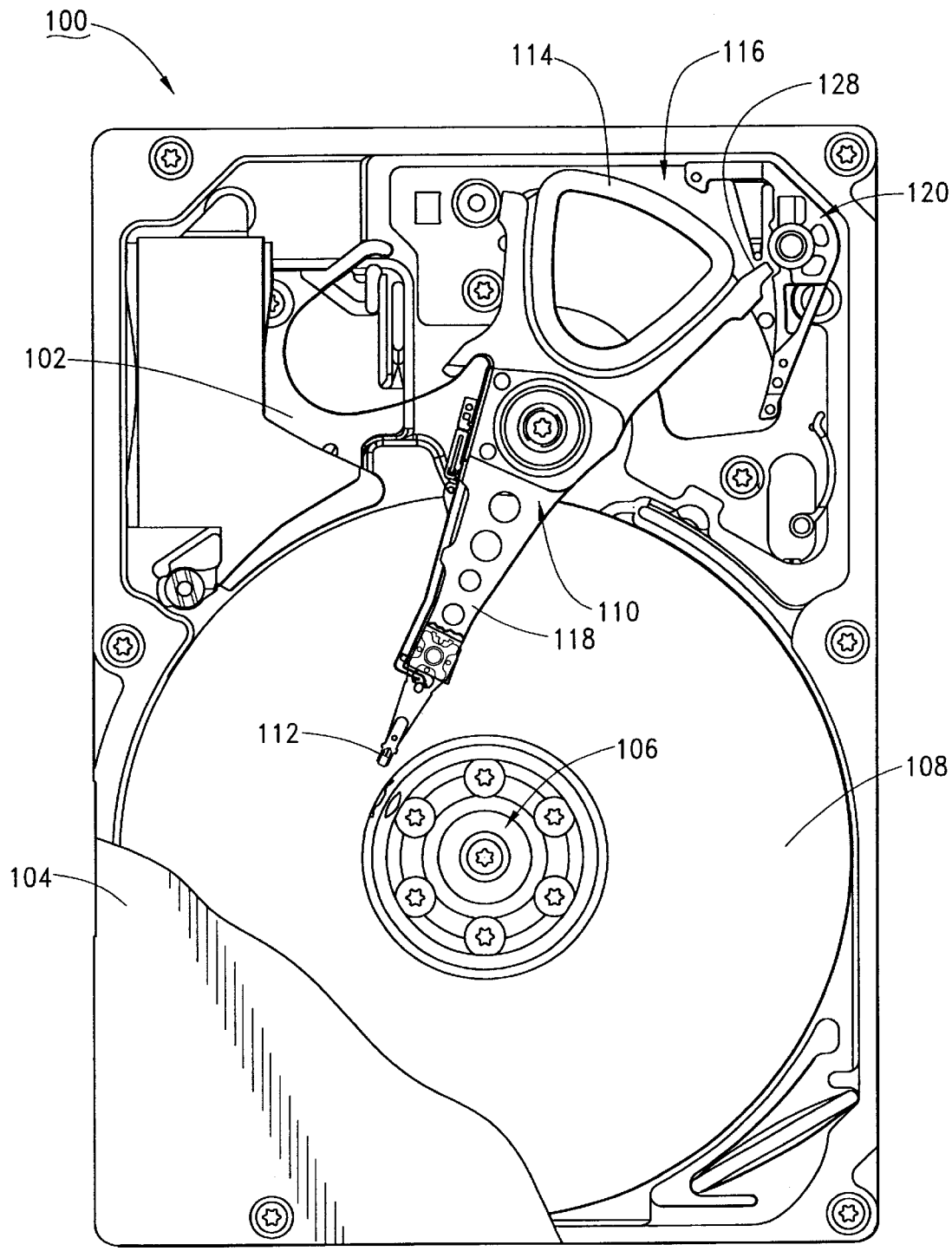
FIG. 1 is a plan view of a disc drive illustrating a magnetic latch constructed in accordance with preferred embodiments of the present invention.

FIG. 1 provides a top plan view of a disc drive 100 constructed in accordance with preferred embodiments of the present invention. A base deck 102 and a top cover 104 (shown in partial cutaway) cooperate to form a sealed housing for the disc drive 100. A spindle motor 106 rotates a number of magnetic recording discs 108 at a constant, high speed.

An actuator assembly 110 supports an array of read/write heads 112 adjacent respective surfaces of the discs 108. The actuator assembly 110 is pivotally moved through the application of current to an actuator coil 114 of a voice coil motor (VCM) 116. The actuator assembly has actuator arms 118 to support the heads 112.

The disc drive 100 includes an exemplary magnetic latch 120 for parking the heads 112 when the disc drive is not in use. FIG. 2 shows an isometric view of the latch 120. It will be understood that there are many mechanical configurations for latches and so the particular configuration of the latch 120 is illustrative and not limiting to the scope of the claimed invention.

The latch 120 is characterized as a magnetic latch which cooperates with permanent magnets of the VCM 116 to latch the actuator 110. Magnetically permeable member 122 is supported adjacent a magnet boundary at a first location to retain the latch in an unlatched position. Magnetically permeable members 124, 126 are supported adjacent a magnet boundary at a second location to retain the latch in a latched position. An actuator engagement arm 128 (shown in FIG. 1) is retained between a retaining surface 130 and a cantilevered, energy absorbing latch arm 132. For reference, the latch 120 is shown in the latched position in FIG. 1.

During a typical latching operation, the actuator engagement arm 128 is brought into contact with the cantilevered latch arm 132, thereby toggling the latch 120 from the unlatched position to the latched position. When the actuator 110 is subsequently unlatched, the actuator 110 is driven against the retaining surface 130 to toggle the latch 120 to the unlatched position and the actuator 110 moves the heads 112 out over the disc surfaces. Substantial forces are applied to the latch 120 as the actuator engagement arm 128 alternately strikes the latch arm 132 and drives against the retaining surface 130.

The latch of the claimed invention is made of a low friction and low wear latch material. The latch material is preferably formed by adding approximately 5% by weight (or mass) arimid fiber (also known as poly-parapheneline terephthalamide fiber) (trade name Kevlar®) and approximately 5% by weight (or mass) polytetrafluoroethylene (PTFE) (trade name Teflon®) to polyetherimide (PEI). It has been found that adding arimid fiber and PTFE to PEI in substantially these percentages results in an improved latch with improved wear characteristics and reduced particle generation.

It is believed that arimid fiber wear characteristics improve and PTFE reduces the frictional, abrasive forces. The arimid fiber and the PTFE are used in a relatively low percentage, as compared to the percentage of PEI used, to retain the mechanical properties of the base polymer PEI. The percentage composition of arimid fiber and PTFE is preferably substantially equal.

Although the mass percentages of the arimid fiber and the PTFE in the latch material should each be about 5%, it is believed that these mass percentages can be varied from a lower limit of about 1% to an upper limit of about 7% without adversely affecting the mechanical properties of the base polymer PEI. However, the percentage compositions of arimid fiber and PTFE in the latch material are preferably maintained at equal levels.

FIG. 3 shows a method 200 for making the latch 120 in accordance with preferred embodiments of the present invention. It will be understood that the various steps are carried out using conventional processing equipment known in the art and so such equipment has not been separately illustrated.

The process begins with the provision of PEI pellets, arimid fibers and PTFE granular molding powder at step 202. At step 204, the PEI pellets are melted, mixed with the arimid fibers and the PTFE granular molding powder and the mixture is extruded with an extruder. At step 206, at an outlet of the extruder, a chopping member chops the extruded mixture into latch material pellets.

The latch material pellets are dried at step 208 to remove any moisture. At step 210, the latch material pellets are placed in a hopper of a molding machine. In addition to the hopper, the molding machine has a barrel portion, a screw, a nozzle, a heater and a mold. At step 212, the screw (located in the barrel portion) draws the latch material pellets from the hopper and mixes the latch material pellets. At step 214, the heater heats the latch material pellets to form a molten mixture. At step 216, the screw applies pressure to the molten mixture against the nozzle. At step 218, the nozzle is then opened and the molten mixture is forced into the mold under pressure. At step 220, after the mold is filled and packed out, the nozzle is closed and the molten mixture solidifies upon cooling in the mold. When the molten material is solidified, the latch 120 is formed and the process ends at step 222.

In a typical automated application, the molding machine also has ejector pins to automatically push the latch into a bin. When the latch is completely formed, the mold opens and the ejector pins push the mold into the bin. With this process, the molding machines typically make three to four latches per minute.

Latches having the material composition discussed above were tested by latching and unlatching the actuator assembly over thousands of cycles. In general, the results of the testing were that latches of the new material have less wear and generate fewer particles for 120,000 cycles of latching/unlatching than the latches of 100% PEI have for 10,000 cycles.

As used in the claims below, the term "substantially non-particulating" means that the latch does not have visible signs of wear or particle generation after 10,000 cycles of latching and unlatching the actuator assembly.

Accordingly, a material compound is provided for a latch (such as 120) for a disc drive (such as 100) to secure an actuator arm (such as 118) of the disc drive when the disc drive is not in use. The latch is made of a base polymer of polyetherimide (PEI) with additives of polytetrafluoroethylene (PTFE) and arimid fiber. A mass percentage of the arimid fiber in the latch material is selected from a range of about 1% to about 7%. A mass percentage of the PTFE in the latch material is selected from a range of about 1% to about 7%. The latch made from this material generates much fewer particles than latches of the existing art. A method for making the latch is also provided.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application for the latch while maintaining the same functionality without departing from the spirit and scope of the present invention.

In addition, although the embodiments described herein are directed to a latch material for a disc drive, it will be appreciated by those skilled in the art that the material can be used for other devices to reduce particle generation without departing from the spirit and scope of the claimed invention.

What is claimed is:

1. A disc drive latch made of a latch material comprising:
   a base polymer;
   a first additive of polytetrafluoroethylene; and
   a second additive of poly-parapheneline terephthalamide fiber.

2. The disc drive latch of claim 1 wherein the base polymer is polyetherimide.

3. The disc drive latch of claim 1 wherein a mass percentage of the poly-parapheneline terephthalamide fiber in the latch material is selected from a range of about 1% to about 7%.

4. The disc drive latch of claim 1 wherein a mass percentage of the polytetrafluoroethylene in the latch material is selected from a range of about 1% to about 7%.

5. The disc drive latch of claim 1 wherein the polytetrafluoroethylene and the poly-parapheneline terephthalamide fiber are present in the latch material compound in substantially equal mass percentages.

6. The disc drive latch of claim 3 wherein a mass percentage of each of the poly-parapheneline terephthalamide fiber and the polytetrafluoroethylene in the latch material is substantially 5%.

7. A disc drive, comprising:
   a data storage disc;
   a spindle motor which rotates the data storage disc;
   a read/write head configured to transduce data stored on the data storage disc;
   an actuator assembly which positions the read/write head with respect to the disc; and
   a substantially non-particulating latch which secures the actuator assembly when the disc drive is not in use, the latch being made of a latch material compound of polyetherimide, polytetrafluoroethylene, and poly-parapheneline terephthalamide fiber.

8. The disc drive of claim 7 wherein the polytetrafluoroethylene and the poly-parapheneline terephthalamide fiber are present in the latch material compound in substantially equal mass percentages.

9. The disc drive of claim 7 wherein each of the polytetrafluoroethylene and the poly-parapheneline terephthalamide fiber is present in the latch material compound in a mass percentage selected from a range of about 1% to about 7%.

10. The disc drive latch of claim 8 wherein a mass percentage of each of the poly-parapheneline terephthalamide fiber and the polytetrafluoroethylene in the latch material is substantially 5%.

* * * * *